(12) United States Patent
No et al.

(10) Patent No.: US 8,520,275 B2
(45) Date of Patent: *Aug. 27, 2013

(54) METHODS FOR GENERATING AN INVERSE MASK

(75) Inventors: Young No, Pittsford, NY (US); James Cossavella, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 280 days.

This patent is subject to a terminal disclaimer.

(21) Appl. No.: 12/908,916

(22) Filed: Oct. 21, 2010

(65) Prior Publication Data

US 2012/0099121 A1    Apr. 26, 2012

(51) Int. Cl.
*H04N 1/46* (2006.01)
(52) U.S. Cl.
USPC ............ 358/517; 358/518; 358/3.28; 399/43
(58) Field of Classification Search
USPC ............ 358/3.28, 1.1, 518, 1.9, 517; 399/43, 399/301, 16, 93, 69
See application file for complete search history.

(56) References Cited

U.S. PATENT DOCUMENTS

| | | | |
|---|---|---|---|
| 5,234,783 A | 8/1993 | Ng | |
| 6,570,599 B2 | 5/2003 | Jacob et al. | |
| 7,012,616 B1 * | 3/2006 | Chatterjee | 345/592 |
| 7,016,621 B1 | 3/2006 | Ng | |
| 7,236,734 B2 * | 6/2007 | Ng et al. | 399/341 |
| 7,324,240 B2 | 1/2008 | Ng | |
| 7,340,208 B2 * | 3/2008 | Ng | 399/329 |
| 7,548,343 B2 * | 6/2009 | Ng et al. | 358/1.9 |
| 7,616,917 B2 * | 11/2009 | Suchy et al. | 399/223 |
| 7,643,175 B2 * | 1/2010 | Tai et al. | 358/1.9 |
| 7,720,425 B2 * | 5/2010 | Ng et al. | 399/342 |
| 7,777,915 B2 | 8/2010 | Kuo et al. | |
| 7,783,243 B2 * | 8/2010 | Cahill et al. | 399/341 |
| 8,005,415 B2 * | 8/2011 | Ng et al. | 399/342 |
| 8,041,264 B2 * | 10/2011 | Suchy et al. | 399/223 |
| 2009/0154943 A1 | 6/2009 | Ciaschi et al. | |
| 2009/0169277 A1 | 7/2009 | Fowlkes et al. | |
| 2009/0180127 A1 * | 7/2009 | Yabe | 358/1.9 |
| 2012/0099122 A1 * | 4/2012 | No et al. | 358/1.1 |
| 2012/0196223 A1 * | 8/2012 | Fowlkes | 430/124.1 |
| 2012/0196224 A1 * | 8/2012 | Fowlkes | 430/124.1 |

* cited by examiner

*Primary Examiner* — Negussie Worku
(74) *Attorney, Agent, or Firm* — Roland R. Schindler, II (57) ABSTRACT

Methods for generating an inverse mask image are provided. In one aspect, image data is determined for an image to be printed said image data having color data for a first set of colors used in a first color model; and, an inverse mask toner image is generated using color data for one of the first set of colors. The inverse mask image is generated based upon the color data for a selected one of the first set of colors so that the inverse mask pattern can be generated without first determining of color separation toner images that define amounts of color toner to be applied to a receiver to form the image.

24 Claims, 4 Drawing Sheets

METHODS FOR GENERATING AN INVERSE MASK

CROSS REFERENCE TO RELATED APPLICATIONS

This application relates to commonly assigned, copending U.S. application Ser. No. 12/908,920, filed Oct. 21, 2010, entitled: "INVERSE MASK GENERATING PRINTER AND PRINTER MODULE" which is hereby incorporated by reference.

FIELD OF THE INVENTION

This invention pertains to the field of printing.

BACKGROUND OF THE INVENTION

In an electrophotographic modular printing machine of known type, for example, the NexPress 2100 printer manufactured by NexPress Solutions, Inc., of Rochester, N.Y., color toner images are made sequentially in a plurality of color imaging modules arranged in tandem, and the toner images are successively electrostatically transferred in registration to a surface that is moved past the imaging modules. This transfer can be made to receiver member that is moved past the imaging modules or to an intermediate transfer member that receives all of the toner images to be used in an image and then transfers these to a receiver member that is moved through a transfer nip. After all of the toner images have been transferred to the receiver member, the receiver member is fused.

Figure 1:
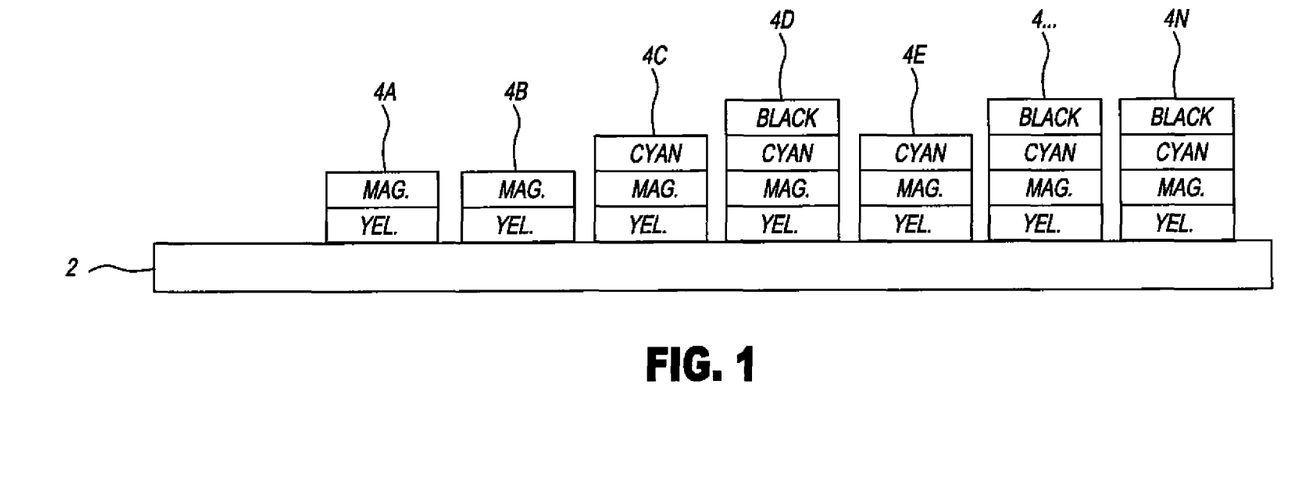
FIG. 1 shows a plurality of color toner stacks on a receiver with a clear toner layer formed on top of each toner stack.

As is known, when the color toners are deposited one upon the other, the respective color toners form toner stacks that will create particular colors at particular locations of the image formed on the receiver member after fusing. The height of a respective color toner stack is the sum of the toner contributions of each color of toner applied at a particular location. FIG. 1 depicts an exemplary section of a receiver member 2 having a plurality of color toner stacks 4A-4N before a fusing operation. As can be seen from FIG. 1, color toner stacks 4A-4N provide a range of color toner stack heights before fusing, with the toner stack heights varying based upon the amount of a particular color toner applied thereto.

Figure 2:
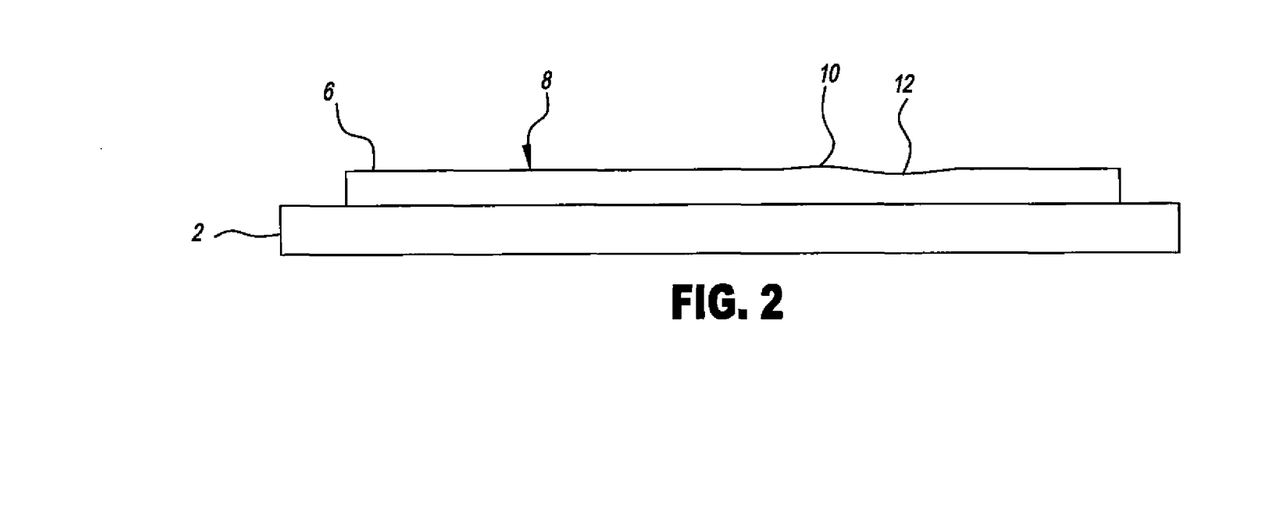
FIG. 2 shows the toner stacks of FIG. 1 in a fused state.

FIG. 2 shows the section of FIG. 1 after fusing. As can be seen in FIG. 2, color toner stacks 4A-4N typically flatten to form a toner mass 6 because of the pressure and heat applied during fusing. However, relief differences remain on upper surface 8 of toner mass 6 between, for example, an area 10 that corresponds to high density color image elements shown in FIG. 1 as having higher toner stack heights e.g. toner stack 4D and an area 12 that corresponds to lower density color image elements shown in FIG. 1 as having a lower toner stack height e.g. toner stack 4E in FIG. 1. These variations are particularly noticeable in that they disrupt the extent to which surface 8 of a toner printed image reflects light in a specular manner. The capability of a printed image to reflect incident light in a specular fashion is typically referred to as gloss.

In a fused toner image, several factors impact gloss. The primary factors indicate the refractive index of the fused toner and the surface roughness of the fused toner. It will be appreciated that more uniform gloss can therefore be provided on an image by forming a toner image with an upper most surface having less surface roughness.

Electrostatographic printers having a three, four, or more color (multicolor) capability are known to also provide an additional toner depositing assembly for depositing clear toner. U.S. Pat. No. 5,234,783, issued on Aug. 10, 1993, in the name of Yee S. Ng, describes a process where gloss of a printed image is improved by applying gloss improving clear toner image to the color toner stacks forming the image. The gloss producing clear toner image varies inversely according to the expected stack heights provided by the other images providing ultimately an even height toner image. Similarly, U.S. Pat. No. 7,016,621, issued on Mar. 21, 2006 in the name of Yee S. Ng, describes the formation of a toner image wherein back-transfer artifacts are reduced or eliminated without the need or expense of providing uniform coverage of clear toner to the print wherein a five color tandem printer is used to print fewer than five colors. The fifth station may be used during the one pass through the printer apparatus, as a clear toner station, to deposit relatively less clear toner in relatively higher colored areas and relatively more clear toner in areas having relatively lower amounts of colored toner.

Such gloss improving clear toner images are also known in the art and referred to as inverse mask toner images. As is noted in the '783 patent, inverse mask toner images can be recorded, for example, on top of the color toner stacks or beneath the color toner stacks.

Methods for determining the inverse mask, however, have remained computationally intense in that, in general, an amount of clear toner to be laid down is calculated for each pixel location in the toner image formed by the multi-layer toner image. See for example, commonly assigned U.S. Pat. No. 7,236,734, entitled Method and Apparatus for Electrostatographic Printing With Enhanced Color Gamut, issued to Ng. et al. on Jun. 26, 2007. As is described therein, incoming image data to be printed is input to a Raster Image Processor and converted to printer dependent color separation image data in each of the four-color images printed by the printer apparatus. The clear toner image generator, which also may be a part of the RIP, creates a clear toner "image" from the four color separation images previously created assuming that glossing is to be done and an inverse mask is to be established for printing of the clear toner.

It is further noted in the '734 patent, that, as a convenience in calculation, rather than determining pigmented toner coverage at any pixel area in accordance with the sum of the four color contributions at that pixel location, one may select the maximum pixel percent contribution by a color separation at that pixel location as the percentage of pigmented toner coverage present at that location for use in determining the amount of clear toner overcoat to be applied in the inverse mask. The use of the single color that is maximum at that location in conjunction with the particular selected inverse mask curve's roll off starting at the mid-tone helps ensure that total toner coverage of the four colors plus clear toner at the pixel location is below 320%, and this is basically true for the entire color gamut. As a further convenience in calculation, in lieu of making such calculation for the inverse mask using a pixel by pixel calculation, one may group local areas of say 4.times.4 pixels or 16 pixels to determine the amount of clear toner in the inverse mask calculation for this small area formed by a group of pixels.

Accordingly, using such techniques, the process of determining an inverse mask is performed after a raster imaging process performs color separation on the supplied image.

Further, to the extent that an image data is submitted for printing in a format that is not readily processed by conventional raster image processors, it may further be necessary to convert digital image data supplied for printing into a format that is preferred by the Raster Image Processor. For example, it may necessary to convert submitted image data that is organized according to one color model into image data that is organized according to a different model. In such situations, it can be necessary to first convert the submitted image data into a data format that can be readily processed by the Raster Image Processor. Accordingly, in such a situation, two conversion steps can be required before the inverse mask image can be generated.

In most applications such conversions can be executed in a timely, technically, commercially, and economically feasible manner.

However, in some circumstances, for example, where images are being printed that incorporate variable data that can change from print to print, there can be very little time available to process the image data before it is used for printing. In such circumstances, it can be beneficial to have a printer and method that enable the creation of a gloss improving inverse mask without requiring generation of a toner image for each color non-masking toner layer.

Accordingly, what are needed are new printers and methods for determining an inverse mask toner image.

SUMMARY OF THE INVENTION

Methods for generating an inverse mask image are provided. In one aspect, image data is determined for an image to be printed said image data having color data for a first set of colors used in a first color model; and, an inverse mask toner image is generated using color data for one of the first set of colors. The inverse mask image is generated based upon the color data for a selected one of the first set of colors so that the inverse mask pattern can be generated without first determining of color separation toner images that define amounts of color toner to be applied to a receiver to form the image.

DETAILED DESCRIPTION OF THE DRAWINGS

DETAILED DESCRIPTION OF THE INVENTION

Figure 3:
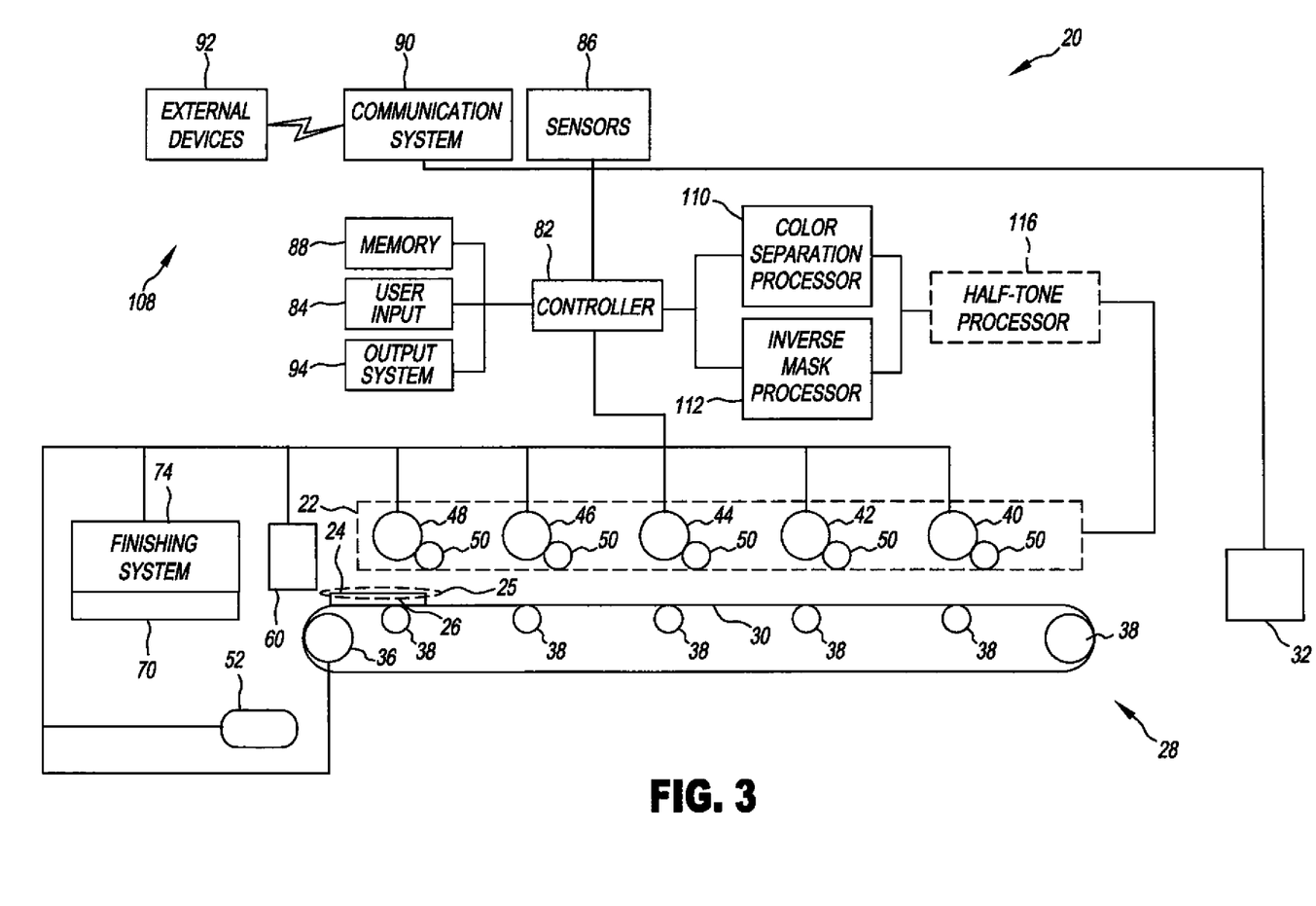
FIG. 3 shows a system level illustration of one embodiment of an electrophotographic printer.

FIG. 3 is a system level illustration of a printer 20. In the embodiment of FIG. 3, printer 20 has a print engine 22 of electrophotographic type that deposits a toner 24 to form a toner image 25 in the form of a patterned arrangement of toner stacks. Toner image 25 can include any patternwise application of toner 24 and can be mapped according to data representing text, graphics, photo, and other types of visual content, as well as patterns that are determined based upon desirable structural or functional arrangements of the toner 24.

Toner 24 is a material or mixture that contains toner particles and that can form an image, pattern, or indicating when electrostatically deposited on an imaging member including a photoreceptor, photoconductor, electrostatically-charged, or magnetic surface. As used herein, "toner particles" are the marking particles electrostatically transferred by print engine 22 to form a pattern of material on a receiver 26 to convert an electrostatic latent image into a visible image or other pattern of toner 24 on receiver. Toner particles can also include clear particles that have the appearance of being transparent or that while being generally transparent impart a coloration or opacity. Such clear toner particles can provide for example a protective layer on an image or can be used to create other effects and properties on the image. The toner particles are fused or fixed to bind toner 24 to a receiver 26.

Toner particles can have a range of diameters, e.g. less than 8 μm, on the order of 10-15 μm, up to approximately 30 μm, or larger. When referring to particles of toner 24, the toner size or diameter is defined in terms of the median volume weighted diameter as measured by conventional diameter measuring devices such as a Coulter Multisizer, sold by Coulter, Inc. The volume weighted diameter is the sum of the mass of each toner particle multiplied by the diameter of a spherical particle of equal mass and density, divided by the total particle mass. Toner 24 is also referred to in the art as marking particles or dry ink. In certain embodiments, toner 24 can also comprise particles that are entrained in a wet carrier.

Typically, receiver 26 takes the form of paper, film, fabric, metallicized or metallic sheets or webs. However, receiver 26 can take any number of forms and can comprise, in general, any article or structure that can be moved relative to print engine 22 and processed as described herein.

Returning again to FIG. 3, print engine 22 is used to deposit one or more applications of toner 24 to form toner image 25 on receiver 26. A toner image 25 formed from a single application of toner 24, for example, can provide a monochrome image or layer of a structure.

A toner image 25 formed from more than one application of toner 24, (also known as a multi-part image) can be used for a variety of purposes, the most common of which is to provide toner images 25 with more than one color. For example, in a four color image, four toners having subtractive primary colors, cyan, magenta, yellow, and black, can be combined to form a representative spectrum of colors. Similarly, in a five color image various combinations of any of five differently colored toners can be combined to form other colors on receiver 26 at various locations on receiver 26. That is, any of the five colors of toner 24 can be combined with toner 24 of one or more of the other colors at a particular location on receiver 26 to form a color different than the colors of the toners 24 applied at that location.

In addition to adding to the color gamut, the fifth color can also be a specialty color toner or spot color, such as for making proprietary logos or colors that cannot be produced with only CMYK colors (e.g. metallic, fluorescent, or pearlescent colors), or a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

In the embodiment that is illustrated, a primary imaging member (not shown) such as a photoreceptor is initially charged. An electrostatic latent image is formed by image-wise exposing the primary imaging member using known methods such as optical exposure, an LED array, or a laser scanner. The electrostatic latent image is developed into a visible image by bringing the primary imaging member into close proximity to a development station that contains toner 24. The toner image 25 on the primary imaging member is then transferred to receiver 26, generally by pressing receiver 26 against the primary imaging member while subjecting the toner to an electrostatic field that urges toner 24 forming toner image 25 onto receiver 26. Toner image 25 is then fixed or fused to receiver 26 using a fuser 60 to become a print 70. An optional finishing system 74 is provided to receive print 70 and to perform additional finishing operations on such fused print 70 such as collating, stacking, folding, binding and stapling as may be required.

In FIG. 3 print engine 22 is illustrated as having an optional arrangement of five printing modules 40, 42, 44, 46, and 48, also known as electrophotographic imaging subsystems arranged along a length of receiver transport system 28. Each printing module delivers a single application of toner 24 to a respective transfer subsystem 50 in accordance with a desired pattern as receiver 26 is moved by receiver transport system 28. Receiver transport system 28 comprises a movable surface 30 that positions receiver 26 relative to printing modules 40, 42, 44, 46, and 48. In this embodiment, movable surface 30 is illustrated in the form of an endless belt that is moved by motor 36, that is supported by rollers 38, and that is cleaned by a cleaning mechanism 52. However, in other embodiments receiver transport system 28 can take other forms and can be provided in segments that operate in different ways or that use different structures. In an alternate embodiment, not shown, printing modules 40, 42, 44, 46 and 48 can each deliver a single application of toner 24 to a composite transfer subsystem 50 to form a combination toner image thereon which can be transferred to a receiver.

Printer 20 is operated by a printer controller 82 that controls the operation of print engine 22 including but not limited to each of the respective printing modules 40, 42, 44, 46, and 48, receiver transport system 28, receiver supply 32, transfer subsystem 50, to form a toner image 25 on receiver 26 and to cause fuser 60 to fuse toner image 25 on receiver 26 to form prints 70 as described herein.

Printer controller 82 operates printer 20 based upon input signals from a user input system 84, sensors 86, a memory 88 and a communication system 90. User input system 84 can comprise any form of transducer or other device capable of receiving an input from a user and converting this input into a form that can be used by printer controller 82. For example, user input system 84 can comprise a touch screen input, a touch pad input, a 4-way switch, a 6-way switch, an 8-way switch, a stylus system, a trackball system, a joystick system, a voice recognition system, a gesture recognition system or other such systems. Sensors 86 can include contact, proximity, magnetic, or optical sensors and other sensors known in the art that can be used to detect conditions in printer 20 or in the environment-surrounding printer 20 and to convert this information into a form that can be used by printer controller 82 in governing printing, fusing, finishing or other functions.

Memory 88 can comprise any form of conventionally known memory devices including but not limited to optical, magnetic or other movable media as well as semiconductor or other forms of electronic memory. Memory 88 can be fixed within printer 20 or removable from printer 20 at a port, memory card slot or other known means for temporarily connecting a memory 88 to an electronic device. Memory 88 can also be connected to printer 20 by way of a fixed data path or by way of communication system 90. Memory 88 can contain image data, suitable tables and control software that is executable by printer controller 82.

Communication system 90 can comprise any form of circuit, system or transducer that can be used to send signals to or receive signals from memory 88 or external devices 92 that are separate from or separable from direct connection with printer controller 82. Communication system 90 can connect to external devices 92 by way of a wired or wireless connection. In certain embodiments, communication system 90 can comprise any circuit that can communicate with one of external devices 92 using a wired connection such as a local area network, a point-to-point connection, or an Ethernet connection. In certain embodiments, communication system 90 can alternatively or in combination provide wireless communication circuits for communication with separate or separable devices using, for example, wireless telecommunication or wireless protocols such as those found in the Institute of Electronics and Electrical Engineers Standard 802.11 or any other known wireless communication systems. Such systems can be networked or point to point communication.

External devices 92 can comprise any type of electronic system that can generate signals bearing data that may be useful to printer controller 82 in operating printer 20.

Printer 20 further comprises an output system 94, such as a display, audio signal source or tactile signal generator or any other device that can be used by printer controller 82 to provide human perceptible signals for feedback, informational or other purposes.

It will be appreciated that printer 20 can receive image data for printing from a variety of sources. In the embodiment of FIG. 3, these sources include memory 88, communication system 90, that printer 20 can receive such image data through local generation or processing that can be executed at printer 20 using, for example, user input 84, output system 94 and printer controller 82. For convenience, these sources are referred to collectively herein as source of image data 108. It will be appreciated, that this is not limiting and that source of image data 108 can comprise any electronic, magnetic, optical or other system known in the art of printing that can be incorporated into printer 20 or that can cooperate with printer 20 to provide information from which image data can be determined.

In the embodiment of printer 20 that is illustrated in FIG. 3, printer controller 82 has a color separation image processor 110 to convert the image data into color separation images and an inverse mask processor 112 to use the image data to generate inverse mask image that can be used by the print modules 40-48 of print engine 22 in generating toner images. An optional half-tone processor 114 is also shown that can process the color separation images and inverse mask images according to any half-tone screening requirements of print engine 22. The operation of these processors will be discussed in greater detail below.

Method for Printing with an Inverse Mask

Figure 4:
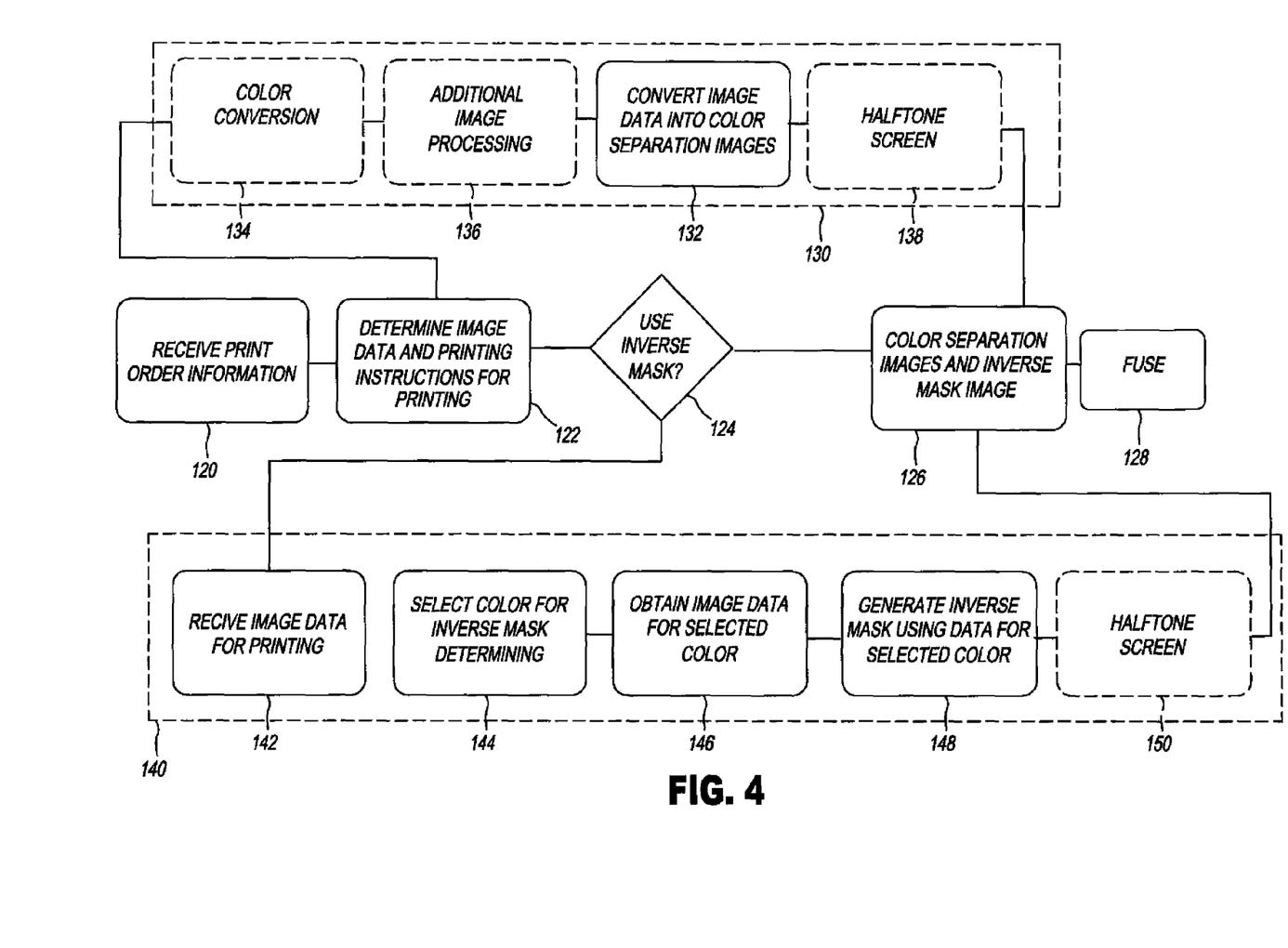
FIG. 4 shows one embodiment of a method for operating a printer including determining an inverse mask image.

FIG. 4 shows a flow chart depicting first method for printing an image having an inverse mask. As is shown in the embodiment of FIG. 4, in a first step, a print order is received including information from which an image to be printed can be determined (step 120). The print order can be received by source of image data 108. The print order can take any known form.

In the embodiment illustrated in FIG. 3, source of image data 108 can comprise any or all of printer controller 82, user input system 84, or memory 88 from communication system 90. As is shown in the embodiment of FIG. 3, in a first step, a print order is received. The print order includes at least some data from which printer controller 82 can determine image data for printing and can optionally include production data from which the manner in which the image data is to be printed can be determined. The production data can also optionally include finishing data that defines how the printed image is to be processed after printing.

The print order information is typically generated external to printer 20. In one example, an external device 92 can comprise what is known in the art as a digital front end (DFE), which is a computing device that can be used to provide an external source of print order information, including image data. Print order information that is generated by such an external device 92 is received at communication system 90 which in turn provides the print order information to printer controller 82.

Similarly, the print order or portions thereof including image data and production data can be determined from data in any other source that can provide such data to printer 20 in any other manner, including but not limited receiving print order information from a portable memory solution that is connected to memory 88.

In certain embodiments image data and/or production data or certain aspects thereof can be generated by printer 20 such as by use of user input system 84 and an output system 94. In one embodiment of this type digital image mastering and/or editing software can be executed printer controller 82 at printer 20. In other embodiments of this type, a digital front end or portions thereof can be incorporated into printer 20. Input system 84 and output system 94 can also be used to make local edits or modifications to the image data such as may be necessary or useful in customizing the image data for printing using printer 20.

Printer controller 82 uses the information in the print order information to determine the image data for printing (step 122). In general, the determined image data includes the entirety of what is to be printed on a receiver by printer 20 and can comprise any pattern that can be provided by delivering one or more applications of toner to a receiver. In this regard, the print order information can generally comprise any type of data or instructions that printer controller 82 can use to locate, obtain, calculate or otherwise provide or make available image data for an image to be printed. For example, and without limitation, the print order can include the image data for printing and this image data can be used for printing. In another example, the print order information can include instructions or data that will allow printer controller 82 and communication system 90 to obtain an image data file from external devices 92.

Further, in other embodiments the print order information can contain data from which printer controller 82 can determine image data for example using an algorithm, mathematical formula or other formula or logical construct. Still further and without limitation, the determined image data can include image data assembled, aggregated, compiled, or integrated from separate data files and/or separate locations and/or other types of information that can be used to obtain, calculate or derive the determined image data or portions thereof.

The determined image data includes color information that is expressed, encoded or otherwise provided in the context of a color model that uses a first set of colors to express image information. For example digital images are typically encoded using a Red, Green and Blue (RGB) color model. The RGB color model is an additive color model in which red, green, and blue light are added in various intensities together to reproduce a broad spectrum of colors. The RGB color model is the color model used in most digital image and digital video capture, processing and soft presentation data formats, including the ubiquitous JPEG, TIFF and MPEG formats. Most digital images are generated and shared in formats that use the RGB color model.

However, most forms of printing work in a subtractive manner, that is colors are formed by applying substances such as colored toner that absorb certain wavelengths of light such that only certain colors are reflected by the receiver. Because of this difference, the RGB color model image data is typically converted into a subtractive color model to enable printing. One color model that is frequently used for printing is the cyan, magenta, yellow and black color model (CMYK). It will be appreciated that the determined image data can have color information that is encoded according to different color models. It also will be appreciated that such other types of color models can express color in ways that are generally equivalent to and can be readily converted into or understood in the context of a first color model having image data for a first set of colors.

Printing instructions can also be determined by printer controller 82 when the image data is determined. As is noted generally above, printing instructions can comprise any information or data of any type or form, including algorithms, formula and logical processes that can inform, contribute to or otherwise help printer controller 82, color separation image processor 110, inverse mask image processor 112 and/or half-tone processor 114 to, in any way, make any decision regarding how the image data is to be converted from image data into patterns of toner that are recorded on a receiver by printer 20 during the printing of the image data. For example, the printing instructions can provide information from which printer controller 82 can determine printing instructions such as whether to form an image on a receiver having a high gloss finish, a matte gloss finish or some intermediary finish or specific instructions regarding whether an inverse mask is to be used in printing an image.

In still other embodiments, the print order information can include data from that can be used by communication system as to obtain the printing instructions from an external device 92.

In one embodiment the print order information has data recorded therein including record fields or other types of data that define or that can be interpreted to define one or more printing instructions. In other embodiments, signals from user input system 84 can be used as the basis for determining the printing instructions.

In still other embodiments, printing instructions can be determined by analysis of the determined image data such as may occur by determining an aspect ratio for the determined image and determining printing instructions, for example, based upon the aspect ratio and a required size of the receiver. The printing instructions can also be determined based upon analysis of other print order information. For example, the print order can include data or instructions from which a receiver length, width, type or quantity can be calculated or otherwise automatically determined, or data indicating a location from which such data can be determined, calculated, or obtained by printer controller 82 such as by way of communication system 90.

The determined image data and, optionally, any determined printing instructions are made available to a color separation image generating process 130 and to an inverse mask determining process (step 140).

During the color separation image generating process 130, a color separation image processor 110 performs a color separation process (step 136) that converts the image data for the image to be printed into color separation images for colors of a second set of colors in the toner used by a print engine in forming the printed image. The color separation images define amounts of color toner to be applied to a receiver to form the elements of the image. During the color separation process (step 136) color separation images are defined so that when toner layers of the colors of the second set are delivered in registration according to color separation images and fused together, the color toner forms an image that has an appearance that corresponds to the appearance called for in the determined image data. Techniques for color image separation are well known in the art.

As is shown in FIG. 4, the color separation image generating process 130 can also optionally use other types of image processing. These can include are but not limited to color conversion (step 134) and other types of additional image processing (step 136). Color conversion (step 134) can be performed where determined image data that converts image data having a first color model into image data according to a second model that uses a second set of colors to represent the image data. Typically, color conversion (step 134) is done to provide image data having a preferred color model when determining the color separation images (step 136). For example, image data for printing can be converted from the RGB color model into the CMYK color model. This can be done in a conventional manner. In a printer 20 having a print engine 22 that uses cyan, magenta, yellow and black toners to form images, the converted image data can be readily used to form toner images that can be recorded by printing modules 40-46. This too is done in a conventional manner.

Additional image processing (step 136) can also be performed. Such additional image processing (step 136) can comprise, for example, color correction or adjustment according to unique characteristics of printer 20 or print engine 22 in order to obtain the desired colors in view of the unique characteristics of print engine 22. As is known in the art, the use of a clear toner inverse mask toner image as an overcoat on the color image can impact color gamut. Where it is determined that an inverse color mask is to be used (step 124), color gamut of the color toners can be modified to reflect such adjustments. Examples of such adjustments are known in the art and are described for example, in U.S. Pat. No. 7,324,240, entitled: "Color Correction Method with Transparent Toner Insignia Images", issued to Yee Ng on Jan. 29, 2008. This patent describes, generally, a method for color correction of an image having an insignia portion in a multi-module printer. In the steps described therein a first color profile is calibrated for a four-color image and a second color profile is calibrated for a four-color image with a transparent toner layer on top of the insignia portion of the four-color image. A plurality of image data is buffered in a color input band buffer. The plurality of image data is processed in the color input band buffer through the first and second color profiles in a color management module and the processed image data is in an output band buffer corresponding to image data processed through each color profile. A clear toner input band data stored in a clear toner input band buffer is compared with the processed image data in each output band buffer to select an output signal on a per pixel basis to send to the multi-module printer. Additional image processing can include applying any instructions for modifying the image information in accordance with the production data.

When this method is used with a printer that is capable of forming five toner images, such as EP printer 20 of the embodiment of FIG. 3, color separation image processor 110 generates color separation images for each toner used in one of print modules 40-48 used for color printing of the image data. For example, to the extent that printing modules 40-46 create toner images using toners of a second set of colors including respectively, black, magenta, yellow and cyan, color separation image processor 100 will create color separation image data for each of these colors. Methods for determining color separation images of this type are well known in the printing arts and the particular method selected is not critical here.

In many cases, the color separation images are created in the form of what is known in the art as a continuous tone image. Where print engine 22 has printing modules 40-48 that are adapted to record images using half-tone screened images, color separation image process 130 will also include a step 138 for converting the color separation images into half-tone color separation images. Accordingly, during the half-tone screening process (step 138) color separation image data is provided to half-tone processor 114. Half-tone processor 114 processes the color separation image data to form half-tone screen separation images for printing using modules 40-46 for the toner of the respective color used by modules 40-46. Any known half-tone screening process that is compatible with any embodiment of a print engine 22 can be used.

Printer controller 82 can be programmed or otherwise made operative to decide whether the toner image formed using color toner is to be formed in registration with clear toner having an inverse mask (step 124). In one embodiment, this decision can be made based on print order data that specifies the use of an image that has an inverse mask applied in registration with the color toner images. In other embodiments, printer controller 82 can determine that an inverse mask toner image is to be applied to whenever printer controller 82 determines that an image is to be formed having a glossy appearance. However, it will be appreciated print order information indicating that an image is to be printed with a matte or semi-gloss finish is not necessarily dispositive of the use of an inverse mask as such an inverse mask can have the effect of removing toner stack height relief patterns that can create unwanted artifacts in both matte finishes and semi-gloss finishes.

Printer controller 82 can also be adapted to decide to apply an inverse mask in registration with color toner layers in other ways. For example, and again without limitation, printer controller 82 can determine that an inverse mask toner image is to be applied based on preprogrammed preferences, based upon document requirements for a series of documents of which the printing of the image data is required. Any other approach for determining when an inverse mask toner image is to be applied in registration with the color toner images can be used.

Where printer controller 82 decides that an inverse mask toner image is to be applied (step 124), inverse mask image processor 112 creates inverse mask image data based upon the color data for a selected one of the first set of colors in the image data. The methods used by inverse mask image processor 112 in determining the inverse mask image data will be described in greater detail below. However, it will be immediately understood that using the determined image data to generate the inverse mask image data instead of using the four color separation images created by color separation image processor 110 can reduce an amount of overall time required to generate the color separation image data and the inverse mask image data required for printing.

For example, inverse mask image processor 112 can begin generating the inverse mask image at about the same time that color separation image processor 110 begins processing image data to generate the color separation images. It will be further understood that irrespective of when such processing begins, inverse mask image processor 112 can generate the inverse mask image during a period of time where the color separation image processor 110 is generating the color image separations.

The inverse mask image is then supplied to half-tone processor 114 which converts the inverse mask image data into screened inverse mask image data that can be used by one of the print modules 40-48 in print engine 22 to apply toner according to the inverse mask in registration with the color toner applied according to the color separation images.

It will be appreciated, however, that the provision and use of half-tone processor 114 is optional and that in embodiments of print engine 22 having printing modules 40-48 that can form continuous tone images, such half-tone conversion is not necessary. Further, in certain embodiments the inverse mask image data can be printed using continuous tone and not half-tone printing.

The four half-tone screened color separation images and the inverse mask half-tone screen separation image are output appropriate frame buffers (not shown) and provided to printing modules 40-48. This can be done directly or by way of appropriate frame buffers or the like. Printer controller 82 causes these to be printed (step 126). In the example embodiment of FIGS. 3 and 4, each printing modules 40-46 apply, in register, black (K), yellow (Y), magenta (M), and cyan (C) color toners and printing module 48 applies a inverse mask toner that in this example takes the form of a clear toner (CT). Again, methods for generating the inverse mask image for the clear toner (CT) will be described in greater detail below.

The printed toner images are then fused and optionally finished in accordance with any finishing information contained in the printing information (step 128.)

It will be appreciated that the embodiment of printer 20 shown in FIG. 3 is exemplary only and that any or all functions described herein as being performed by any of color separation image processor 110, inverse mask image processor 112 and the half-tone processor 114 can be provided by printer controller 82 or by any other suitably programmed computer and/or logic device, and that is adapted to employ stored or generated threshold matrices and templates for processing color separation images to form half-tone screen separation images having data into rendered image data in the form of half-tone information suitable for printing. Similarly, the functions ascribed herein as being performed by any of color separation image processor 110 inverse mask image processor 112 or half-tone processor 114 can also be provided by an external device 92 which conveys color separation images (optionally half-tone screened) and/or inverse mask images to printer controller 82 by way of communication system 90 or by way of other known data conveyance methods, including but not limited to a removable type of memory 88, or by way of source of image data 108. In other embodiments, printer controller 82 can perform any or all of the steps of the color separation image generating process 130 and the inverse mask image generating process 140 and in such embodiments printer controller 82 can act as for the color separation image processor 110, inverse mask image processor 112 and half-tone processor 114, or portions thereof.

The toner applied to form the inverse mask can be applied before or after recording of one or more color toners. The toner forming the inverse mask can be clear or otherwise. In the latter case, such toner will typically be located below one or more layers of color toner.

Method for Generating Inverse Mask Image

FIG. 4 shows a first embodiment of a method for determining an inverse mask image.

As noted above, in the prior art step 132 is a precursor to the determination of the inverse mask images. However, as is shown in the embodiment of FIG. 4, an inverse mask toner image is created without reference to the color separation image information. Instead, as is shown in FIG. 4, the process for determining an inverse mask toner image begins with the receipt of image data for the image to be printed (step 142).

The image data for the image to be printed has image data having color data for a first set of colors used in a first color model. As noted above, the image data for the image to be printed can have for example and without limitation image data that is stored according to the red, green and blue color model as is done in conventional RGB digital image data formats or the CMYK color model.

One of the colors of the digital image data is selected for use in generating the inverse mask image (step 144). This color can be predetermined. For example, in certain embodiments, inverse mask image processor 112 can be preprogrammed to use a particular one of the first set of colors in the first color set for determining the inverse mask. For example, for an image data with color stored according to a red, green and blue color green image data can be used.

Here, green is selected because the toner density used to create image elements that have high density green content tend to correlate more closely to higher toner stack heights formed on a printed receiver than do the other available channels, red and blue. Said another way, high density green areas tend to be more indicative of areas of a toner printed image that are printed using high density combinations of toner and therefore areas that also have the highest stack heights. For similar reasons, where the first color model has image data in a CMYK color model, the magenta color can be used. Printer 20 can also use other colors when different color models are used and like considerations can be used to select the color used to determine an inverse mask based upon color data stored according to such other color models.

It will be appreciated that in many situations the second set of colors is different from the first set of colors. Accordingly, it can be difficult to accurately predict an amount of toner of the second set of colors that will be required to create a toner image having a particular image density. However, if the first image data is provided according to, for example, a RGB model, the use of the green channel can be advantageous. This is because the human eye has enhanced sensitivity to green and, accordingly, the green channel tends to be a reliable proxy for luminance data in a printed image whether the luminance variations are created in green or in other color channels. Accordingly, green can be selected because green color data overall tends to have a density that is more proportional generically, to high density printing areas having relatively large amounts of toner, high toner concentrations or that have toner stack heights that are relatively high.

Although not benefitting from enhanced visual sensitivity, the use of the magenta channel to generate an inverse mask image for image data that is stored according to the CMYK color model can provide similar advantages in that high magenta density can serve as a proxy for high density printing regions having high overall concentrations of toner that are consistent with high toner stack height portions of the image.

In certain embodiments, inverse mask image processor 112 can perform a color analysis on the image data for each image to be printed as a part of selecting one of the first set of colors. This can be done quickly using simple sampling, statistical or histogram analysis techniques known to those of skill in the art. This can be done to verify that a predetermined color such as green or magenta is appropriate for selection with regard to a particular image. Specifically, color analysis may simply test the image data to determine if there is at least a minimum threshold of color content of the preselected color in the image data. Where color analysis indicates that the color content is below the threshold, a more general analysis of the color content of the images can be performed if appropriate.

In another embodiment, inverse mask image processor 112 analyzes the color data for each available color in the first set of colors provided in the image data and selects one of the first set of colors for use in generating an inverse mask by determining that the selected one of the first set of colors has a density that is more proportional to amounts of color toner or to stack heights of color toner that the printer will apply to form the printed images than other colors in the first set of colors. In other embodiments, inverse mask image processor 112 can select one of the colors from the first set of colors that best corresponds to the luminance or contrast information in the image data for the image to be printed. Here too, the selection of a predetermined first one of the colors can be made based on these factors, and inverse mask image processor 112 can make such a determination on an image by image basis.

Inverse mask image processor 112 can perform the color analysis using the image data only or it can perform the color analysis on parts thereof using other information stored in the image data or print order information or that can be determined based on such information. For example, where the image data is associated with thumbnail information containing a for example a so-called "thumbnail" version of the image as is incorporated in some types of digital image files that contain image data, a down sampled version of the image data or information from which nature or extent of the use of the particular colors in the first set of colors can be compared statistically, algorithmically or in other ways to make a determination as to which one of the colors has image data that is more proportional to an amount of color toner that will be applied to form the image elements of the image to be printed.

In certain embodiments, it may be useful to perform the process of color analysis based on additional factors such as to address printing instructions that significantly impact the color content of an image, such as printing instructions to mask a portion of an image, to crop out a portion of an image, or to apply a uniform coloration or tint to an image.

Inverse mask image processor 112 then obtains image data for the selected one of the colors of the first set of colors that are available in the image data for the images to be printed (step 146). Typically, this will involve extracting the image data for the selected color from the image data. However, this can be done in any conventional fashion known for accessing data representing image density for one color of an image data file.

Inverse mask image processor 112 then uses the obtained image data for the selected color to generate the inverse mask image (step 148). In one embodiment, inverse mask image processor does this by inverting the image densities for the selected color. The inverted color image data is then used as the basis for forming an inverse mask image. Here this is done by generating an inverse mask image that can be formed or provided in registration with the color toner images and that has a clear toner image density that is proportional to the image densities of the inverted image color data for the selected color. Such toner image will have an inverse mask toner density that is proportional to the image densities of the inverted image color data but can be generated without determining the color separation images for the color toner used to form the image.

In alternative embodiments, the relationship between image density of the selected color at a particular pixel location and a preferred amount of inverse mask image density at that pixel location can vary in accordance with a predefined non-linear functional relationship, such as where a first range of inverse mask image density is used when the image density of the image data for the selected color at the pixel location is within a first density range, a second range of inverse mask image density is used when the image density of the of the image data for the selected color is at a second density range etc. The precise density for a particular toner used for making an inverse mask image can be determined experimentally and will vary depending on the color toners used and the inverse mask toner used in printing the image.

In some cases, the process of determining an inverse mask image can include factors that reduce the overall amount of inverse mask toner applied. For example, in certain embodiments an inverse mask image can target less than 100% inverse mask toner coverage targeting, instead, 70-90 percent. This conserves toner and also provides for reducing the negative impact on color gamut when clear toner is applied to form the inverse mask in a manner that overlies the colors. Thus, not only cost savings are realized but also, an additional advantage of color gamut maintenance is obtained. In considering percentage coverage, 100% density by the inverse mask toner implies a representative small area is totally covered with clear toner while for example 90% coverage implies that only 90% of the small area is covered. This can be done using half-toning algorithms.

It will be appreciated that alternatively, the inverse mask image can be optimized to, in addition to the above requirements, reduce gamut loss and may be variable in accordance with the substrate used for the receiver or process stability.

Inverse Mask Module for Use with a Printer

Figure 5:
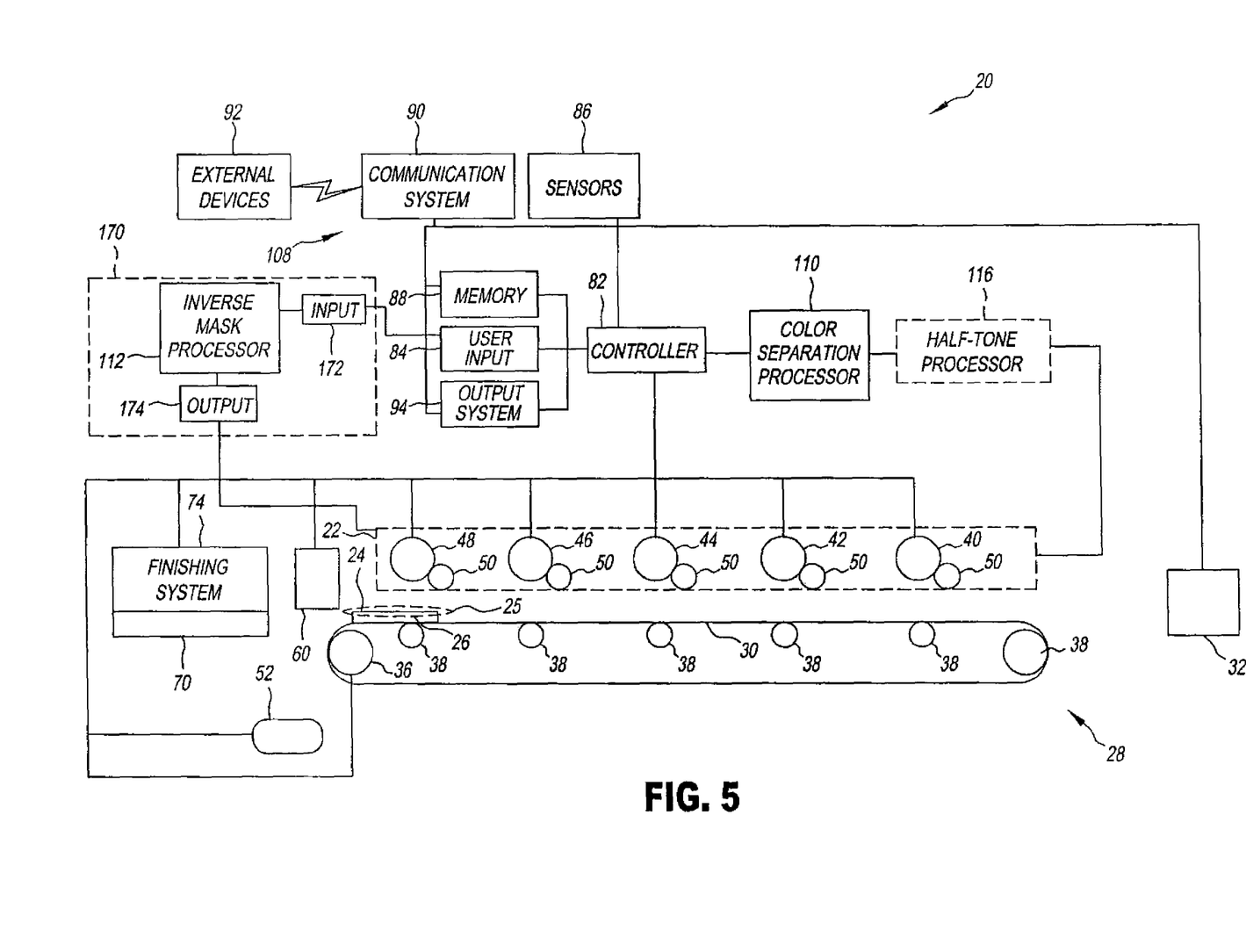
FIG. 5 shows one embodiment of an inverse mask image generating module for a printer.

FIG. 5 illustrates yet another embodiment, wherein an inverse mask image generating module 170 is provided for a printer 20 having a source of image data 108 providing information from which image data for an image to be printed can be determined and a print engine 22 for recording toner images on a receiver 26 with the image data providing color data for a first set of colors of a first color model. In this embodiment the inverse mask image generates module 170 which has an input 172 adapted to receive from the source of image data 108 image data for an image to be printed said image data having color data for a first set of colors used in a first color model. Input 172 can comprise any form of wired, wireless, or optical connection that can be made to source of image data 108 to obtain the image data for printing, inverse mask image processor 112 that, in this embodiment, can execute the inverse mask image generating process 140 to generate an inverse mask image using color data for one of the first set of colors. Module 170 also has an output 174 providing the inverse mask image for use by print engine 22 or a specific module therein. As described above, the inverse mask image can generated based upon the color data for a selected one of the first set of colors so that the inverse mask pattern can be generated without first determining color separation toner images that define amounts of toner to be applied to form the image.

It will be appreciated that the methods and apparatuses described herein can be used with other types of printers that have a print engine that deposits material onto a receiver in layers that build up on a receiver including but not limited thermal mass transfer and wax transfer systems.

What is claimed is:

1. A method for generating an inverse mask toner image, the method comprising the steps of:

determining image data for an image to be printed, said image data having color data for a first set of colors used in a first color model; and, generating an inverse mask toner image using the color data for one of the first set of colors;

wherein the inverse mask toner image is generated based upon the color data for a selected one of the first set of colors so that the inverse mask toner image can be generated without first determining color separation toner images that define amounts of color toner to be applied to a receiver to form the image.

2. The method of claim 1, wherein the color data used to generate the inverse mask toner image is color data for a color in the first set of colors that has a density that is more proportional to an amount of color toner that a printer will apply to form the printed color image than other colors in the first set of colors.

3. The method of claim 1, wherein toners used to print the image have colors of a second set of colors that is different from the first set of colors.

4. The method of claim 1, wherein the first set of colors includes red, green, and blue and wherein green color data is used to generate the inverse mask toner image.

5. The method of claim 1, wherein the first set of colors includes cyan, magenta, yellow and black and wherein color data is for the magenta color used to generate the inverse mask toner image.

6. The method of claim 1, wherein the inverse mask toner image is generated by inverting density information in the color data for the color used to generate the inverse mask toner image.

7. The method of claim 1, further comprising the step of determining the color to be used in forming the inverse mask toner image by analyzing the color data for each of the colors of the first set of colors in the image and, based on the analysis of the color data, using color data for the one of the first set of colors that is most proportional to an amount of color toner used to form the image elements of the printed image.

8. The method of claim 1, wherein the inverse mask toner image generates using color data for a color in the first set of colors that is determined to have a density that is more proportional to stack heights of color toner that will be applied to form the colors of the printed image than other colors in the first set of colors.

9. The method of claim 1, wherein the first set of colors includes red, green and blue and wherein the printer forms the image using toner of a second set of colors including cyan, magenta, yellow and black.

10. The method of claim 1, wherein the selected color is the color from the first set of colors or that best corresponds to luminance information in the image data to be printed.

11. The method of claim 1, further comprising the step of converting the inverse mask toner image into a half-tone screened inverse mask image.

12. A method for printing images having an inverse mask, the method comprising the steps of:
  determining image data for an image to be printed with said image data having color data for each of a first set of colors used to represent the image to be printed;
  generating an inverse mask image;
  converting the determined image data into a color separation image for each toner to be used in forming the printed image, wherein the color separation images are defined so that, after deposition in registration and fusing, the toner will form a color image having an appearance corresponding to the image data;
  providing the color toner in registered layers according to the determined color separation images to form color toner stacks on the receiver,
  providing inverse mask toner according to the inverse mask image in registration with the registration of the color toner on the receiver;
  fusing the toner to the receiver;
  wherein the inverse mask toner image is generated based upon color data for a selected one of the first set of colors so that the inverse mask image can be generated independent of the converting step.

13. The method of claim 12, wherein the step of converting the determined image data into a color separation image for each toner to be used in forming the printed image comprises converting the image data into image data of a different color model and the color separation images are determined based on the converted image data.

14. The method of claim 12, wherein color toners of a second set of colors are used for printing with the second set of colors having different colors than the first set of colors.

15. The method of claim 12, wherein the color data used to generate the inverse mask image is color data for a color in the first set of colors that has a density that is more proportional to an amount of color toner that a printer will apply to form the color data for the selected color than other color data for other colors in the first set of colors.

16. The method of claim 12, wherein the first set of colors includes red, green, and blue and wherein green color data is used to generate the inverse mask image.

17. The method of claim 12, wherein the first set of colors includes cyan, magenta, yellow and black and wherein color data for the magenta color is used to generate the inverse mask image.

18. The method of claim 12, wherein the inverse mask is generated by inverting density information in the color data for the color used to generate the inverse mask image.

19. The method of claim 12, further comprising the step of determining the color to be used in forming the inverse mask image by analyzing the color data for the colors of the first color model used in the image data and, based on the analysis of the color data, using color data for the one of the first set of colors having a density that is more proportional to a stack height of color toners that will be applied to form the printed image than other colors of the first set of colors.

20. The method of claim 12, wherein the selected color is the color that best corresponds to luminance information in the image data for the image to be printed.

21. The method of claim 12, wherein the inverse mask image generating step and the determining color separation images step begins at about the same time.

22. The method of claim 12 wherein the inverse mask image generating step occurs during a period of time when the determining of the color separation images occurs.

23. The method of claim 12, wherein the first set of colors includes red, green and blue and wherein the printer forms the image using toners of a second set of colors including cyan, magenta, yellow and black.

24. The method of claim 12, wherein the selected color is the color from the first set of colors or that best corresponds to luminance information in the image data to be printed.

* * * * *